March 14, 1933.  H. V. ATWELL  1,901,576
PREVENTION OF EVAPORATION LOSSES
Filed April 25, 1927  3 Sheets-Sheet 1
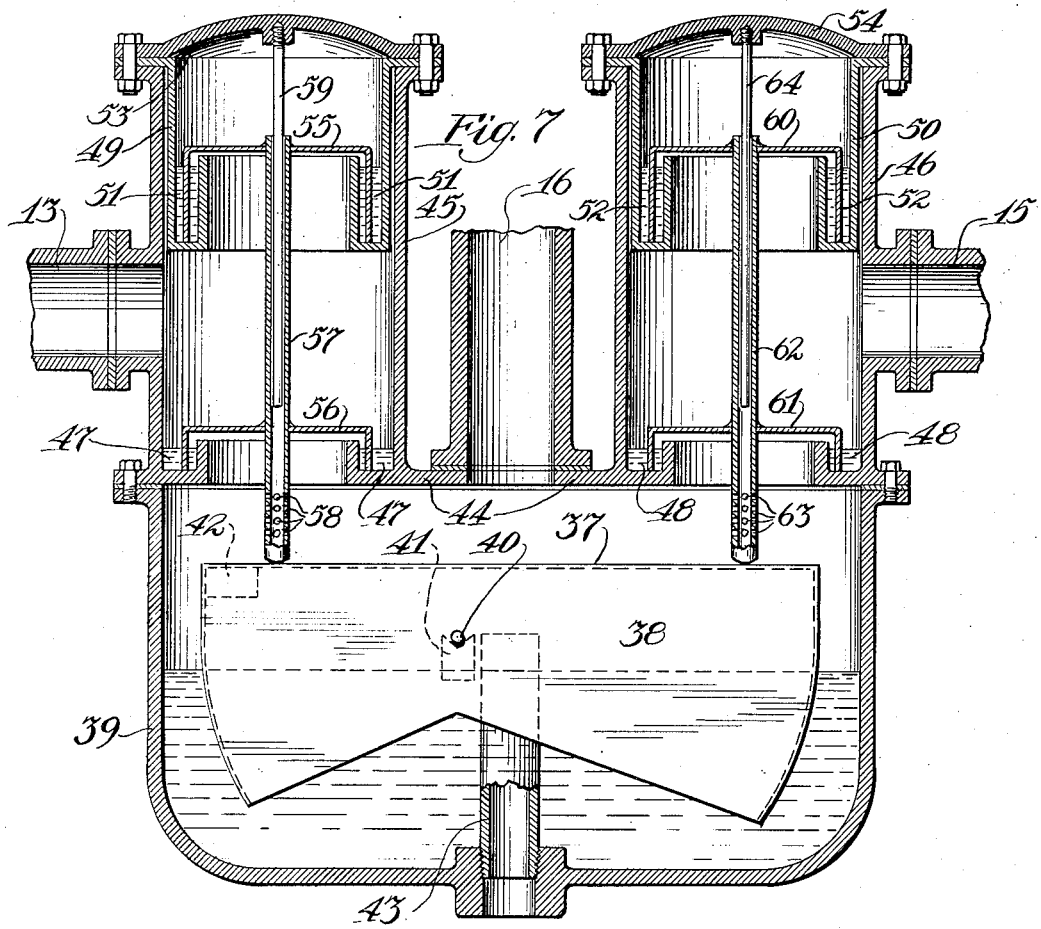
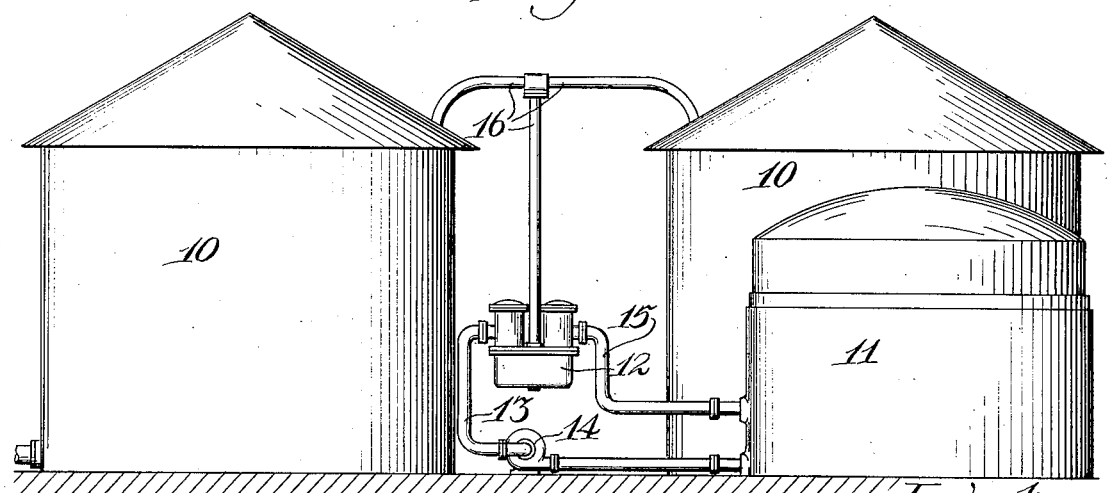
Inventor,
Harold V. Atwell,
By Dyrenforth, Lee, Chritton & Wiles,
Attys.

March 14, 1933.  H. V. ATWELL  1,901,576

PREVENTION OF EVAPORATION LOSSES

Filed April 25, 1927   3 Sheets-Sheet 2

Inventor
Harold V. Atwell
By Dyrenforth, Lee, Chritton & Wiles
Attys.

March 14, 1933.  H. V. ATWELL  1,901,576
PREVENTION OF EVAPORATION LOSSES
Filed April 25, 1927  3 Sheets-Sheet 3
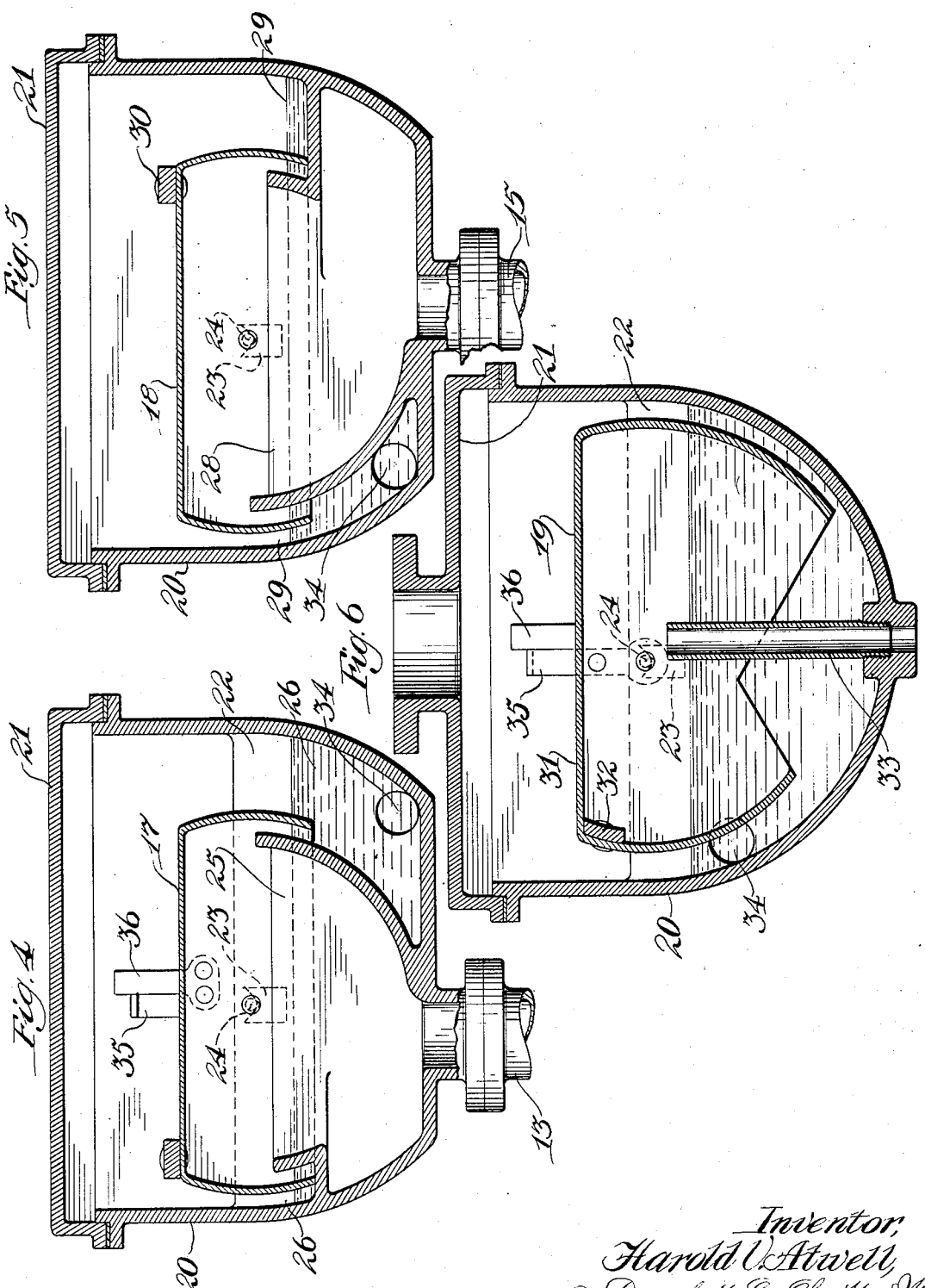

Patented Mar. 14, 1933                                                     1,901,576

UNITED STATES PATENT OFFICE

HAROLD V. ATWELL, OF WHITING, INDIANA, ASSIGNOR TO STANDARD OIL COMPANY, OF CHICAGO, ILLINOIS, A CORPORATION OF INDIANA

PREVENTION OF EVAPORATION LOSSES

Application filed April 25, 1927. Serial No. 186,478.

Figure 2:
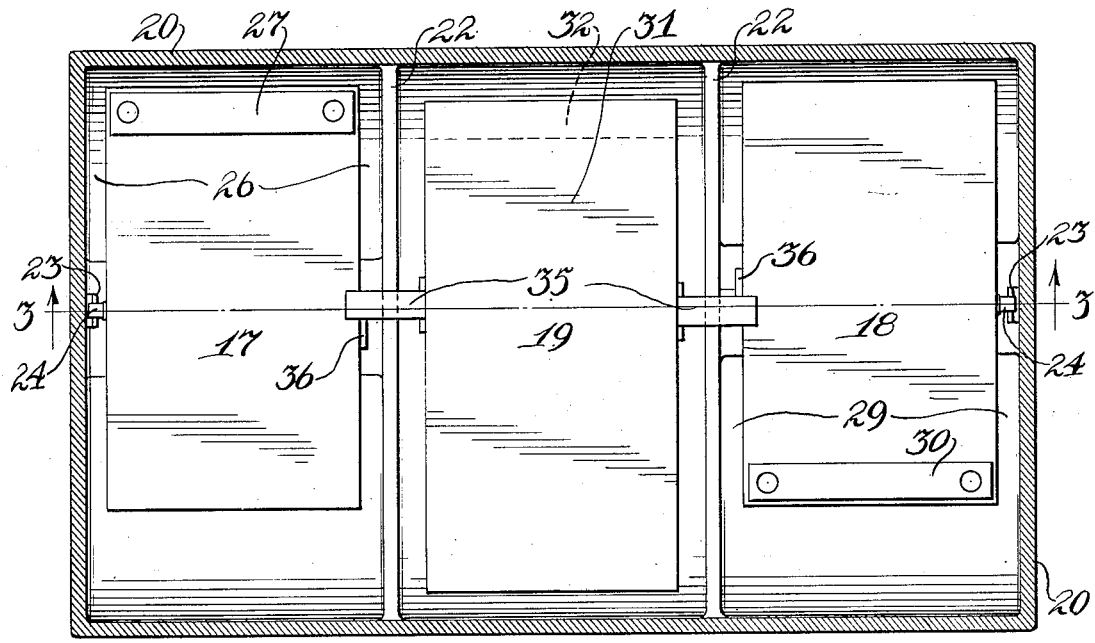
Figure 3:
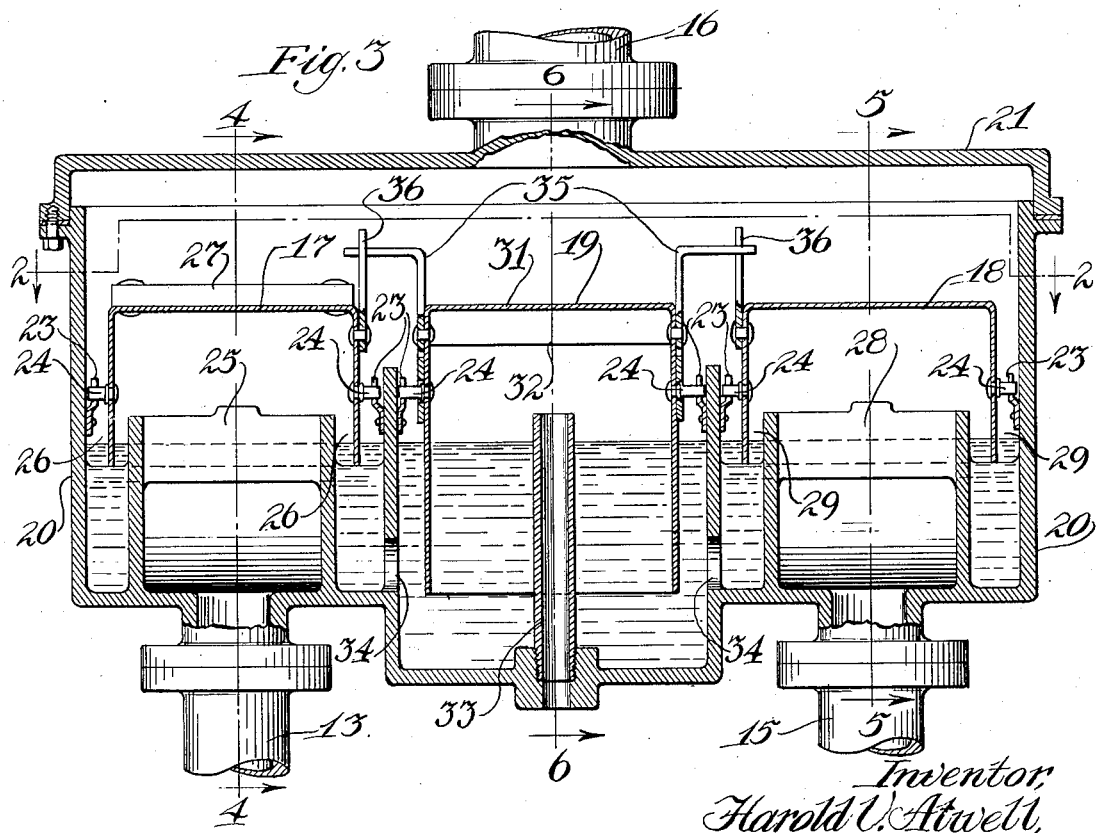

This invention relates to the prevention of evaporation losses, particularly from gasoline or other petroleum products containing volatile fractions. The invention will be readily understood from the following description illustrated by the accompanying drawings, in which Figure 1 is an elevation of a general apparatus embodying the invention, Fig. 2 is a sectional plan of the control apparatus, taken on the line 2—2 of Fig. 3,
Fig. 3 is a sectional elevation on the line 3—3 of Fig. 2,
Fig. 4 is a sectional elevation on the line 4—4 of Fig. 3,
Fig. 5 is a sectional elevation on the line 5—5 of Fig. 3,
Fig. 6 is a sectional elevation on the line 6—6 of Fig. 3, and Fig. 7 is a sectional elevation of a modified form of the control apparatus.

Referring to the drawings, and particularly Fig. 1, 10 are storage tanks for the volatile liquid and 11 is a vapor storage device which may be a gas-holder of conventional form. 12 is the control apparatus, which will be fully described hereinafter. From the control apparatus, line 13 leads vapors to pump 14, by which they are forced to the gas-holder 11. The pump 14 is preferably controlled and operated so as to maintain a slight vacuum in the line 13. A line 15 leads from the gas-holder 11 to the control apparatus 12. Lines 16 lead from the vapor spaces of the tanks of the storage system to the control apparatus 12.

Referring to the form of control apparatus illustrated by Figs. 2, 3, 4, 5, and 6, 17 and 18 are valves controlling the pipes 13 and 15 respectively and 19 is a pressure operated motor for controlling said valves. The valves 17, 18 and motor 19 are located within a chamber 20 which is provided with a cover 21. The chamber 20 is provided with two transverse partitions 22, which terminate substantially below the top of the chamber 20. The partitions 22 and the end walls of the chamber 20 carry brackets 23 provided with V-slots which serve as bearings for the valves 17, 18 and motor 19 which are individually provided with studs 24 for engagement therewith.

The pipe 13 terminates within the chamber 20, in an upwardly directed mouth 25, surrounded by a channel 26 adapted to receive sealing liquid. On one side the channel 26 is sufficiently deep to permit the valve 17 to open and on the other side is preferably shallower to provide an abutment for said valve. The valve 17 is preferably an inverted cup, pivoted as described and provided with a weight 27 which tends to keep the valve 17 in a position normally closing the mouth 25.

The pipe 15 terminates within the chamber 20, in an upwardly directed mouth 28, surrounded by a channel 29 adapted to receive sealing liquid. On one side the channel 29 is sufficiently deep to permit the valve 18 to open and on the other side is preferably shallower to provide an abutment for said valve. The valve 18 is preferably an inverted cup, pivoted as described and provided with a weight 30 which tends to keep the valve 18 in a position normally closing the mouth 28. The valves 17 and 18 are arranged so as to open in opposite directions; for example, with reference to Figs. 4 and 5, valve 17 is adapted to be opened by movement in the clockwise direction and valve 18 by movement in the counterclockwise direction.

The motor 19 is located within the chamber 20 between the valves 17 and 18. The motor 19 comprises an inverted cup 31 provided with studs 24 by which it is pivoted on the V-slots of brackets 23 carried by the transverse partitions 22. The inverted cup 31 is provided with deeply depending sides, since it is intended that they shall not completely emerge from the liquid in which they are immersed. The studs 24 of the inverted cup 31 are considerably off-center as shown in Fig. 6 so as to provide a considerably greater pressure surface on one side than the other. On its shorter side and preferably internally, the inverted cup 31 is provided with a weight 32 so as to balance substantially the greater mass of the longer side of the cup. Beneath the inverted cup 31, a pipe 33 extends upwardly from the bottom of the chamber 20, said pipe terminating above the level of the liquid in said chamber, so that the under surface of the inverted cup 31 is exposed to atmospheric pressure. The partitions 22 are preferably perforated as at 34 so that the liquid level is the same in the three compartments. The pipe 16 leads into the chamber 20 above the liquid level therein, being preferably connected to the cover 21 thereof, so that the upper surface of the inverted cup 31 is exposed to the pressure on the vapor spaces of the storage system.

On either side of inverted cup 31 are mounted L-shaped metal strips 35, preferably located in the vertical plane of its pivoting studs 24. The horizontal arms of the strips 35 overhang the adjacent valves 17 and 18. Each of said valves has mounted thereon a vertical strip 36 which is adapted to contact with one of said strips 35 so that one or the other of said valves is rotated and opened when the inverted cup 31 moves in one direction or the other.

The operation is as follows. When the pressure in the liquid storage system exceeds atmospheric pressure by an amount which may be predetermined by the mass of the weight 27, the excess pressure on the larger side of the inverted cup 31 causes it to tilt downwardly so as to open valve 17. Thereupon vapors are allowed to escape from the liquid storage system into the vacuum line 13 from which they are removed into the gas holder 11 by pump 14. This continues until the excessive pressure in the liquid storage system is relieved and is insufficient to maintain the cup 31 tilted, whereupon the valve 17 closes.

When the pressure in the liquid storage system falls below atmospheric pressure by an amount which may be predetermined by the mass of the weight 30, the excess pressure on the larger side of the inverted cup 31 causes it to tilt upwardly so as to open valve 18. Thereupon vapors are allowed to pass from the gas holder 11 to the liquid storage system until the difference of pressure is reduced and is insufficient to maintain cup 31 tilted, whereupon the valve 18 closes.

The valves 17 and 18 are uninfluenced by the pressure in the chamber 20 or in the lines 13 and 15, and their opening and closing is controlled exclusively by the differential between the atmospheric and liquid storage space pressures acting on motor 19.

Referring to the modified construction illustrated in Fig. 7, 37 is a motor which is generally similar to the motor 19. The motor 37 comprises an inverted cup 38, pivotally mounted within a chamber 39 by means of studs 40 which rest on brackets 41 provided with V-shaped slots, said brackets being mounted on opposite sides of the chamber 39. The inverted cup 38 is provided with deeply depending sides, since it is intended that they shall not completely emerge from the liquid in which they are immersed. The studs 40 are considerably off-center so as to provide a considerably greater pressure surface on one side than the other. On its shorter side and preferably internally the inverted cup 38 is provided with a weight 42 so as to balance substantially the greater mass of the larger side of the cup. Beneath the inverted cup 38, a pipe 43 extends upwardly from the bottom of the chamber 39, said pipe terminating above the level of the liquid in said chamber so that the under surface of the inverted cup 38 is exposed to atmospheric pressure.

The chamber 39 is provided with a cover 44 which is fastened thereto in airtight manner, for example, by bolts, with an intervening gasket. From the cover 44 ascend hollow preferably cylindrical extensions 45, and 46, suitably integral with said cover and located over the short and long ends respectively of the inverted cup 38. Within the extensions 45, and 46 near their lower ends are provided peripheral channels 47 and 48, adapted to contain sealing liquid. Within the upper part of the extensions 45 and 46 are provided cylindrical members 49 and 50, provided at their lower ends with internal peripheral channels 51 and 52, adapted to receive sealing liquid. Above the cylindrical members 49 and 50 are located covers 53 and 54. The members 45, 49 and 53 are provided with registering flanges so that they may be bolted together in air-tight manner. The members 46, 50 and 54 likewise are provided with registering flanges so that they may be similarly bolted together. Within the extension 45 are provided an inverted cup 55 having a skirt depending into the sealing liquid in channel 51 and an inverted cup 56 of equal cross sectional area, having a skirt depending into the sealing liquid in channel 47. The cups 55 and 56 are fixedly mounted on a hollow stem 57 which extends downwardly to the upper surface of the inverted cup 38. The stem 57 is open at its upper end and is provided with a closed rounded lower end for co-operation with the inverted cup 38. Between the cup 56 and its lower end the stem 57 is perforated at 58 so that the pressure of the vapors above the inverted cup 38 is exerted on the upper side of cup 55, through perforations 58 and hollow stem 57. The cup 55 and channel 51 are preferably deeper than the cup 56 and channel 47, since it is preferred to vent exclusively through the lower seal. From the cover 53, depends a guide-rod 59 which extends into the hollow stem 57, the rod being smaller than the interior of the stem so that pressure communication is not interrupted thereby.

Within the extension 46 a similar valve cup assemblage is provided comprising an inverted cup 60 having a skirt depending into channel 52 and an inverted cup 61 of equal cross-sectional area, having a skirt depending into the sealing liquid in channel 48. The cups 60 and 61 are fixedly mounted on a hollow stem 62 which extends downwardly to the upper surface of the inverted cup 38. The stem 62 is open at its upper end and is provided with a closed rounded lower end for co-operation with the inverted cup 38. Between the cup 61 and its lower end the stem 62 is perforated at 63 so that the pressure of the vapors above the inverted cup 38 is exerted on the upper side of cup 60, through perforations 63 and hollow stem 62. The cup 60 and channel 52 are preferably deeper than the cup 61 and channel 48, since it is preferred to vent exclusively through the lower seal. From the cover 54 depends a guide-rod 64 which extends into the hollow stem 62, the rod being smaller than the interior of the stem so that pressure communication is not interrupted thereby. The vapor pipe 16 from the liquid storage system communicates with the upper part of chamber 39 being preferably connected to the cover 44 thereof. The vacuum line 13 is connected to the extension 45 between the cups 55 and 56, and the pressure line 15 is connected to the extension 46 between the cups 60 and 61.

The operation of the apparatus illustrated in Fig. 7 is as follows. When the pressure in the liquid storage system exceeds atmospheric pressure by an amount which may be predetermined by the mass of the stem 57 and the cups 55 and 56 carried thereby, the excess pressure on the larger side of the inverted cup 38 causes it to tilt downwardly raising the shorter side of the cup 38 and thereby the stem 57 and inverted cups 55 and 56 until the latter is withdrawn from the liquid in channel 47, whereupon vapors pass from the liquid storage system through pipes 16 and extension 45 to the vacuum line 13 from which they are removed into the gas-holder 11 by pump 14. This continues until the excessive pressure in the liquid storage system is relieved and is insufficient to maintain the cup 38 tilted, whereupon the cup 56 returns to its closed position.

When the pressure in the liquid storage system falls below atmospheric pressure by an amount which may be predetermined by the mass of the stem 62 and the cups 60 and 61 carried thereby, the excess pressure on the larger side of the inverted cup 38 causes it to tilt upwardly, raising the stem 62 and inverted cups 60 and 61 until the latter is withdrawn from the liquid in channel 48, whereupon vapors pass from the gas holder 11 by pipe 15 extension 46 and chamber 39 into pipe 16 by means of which the vapors pass to the liquid storage system. This continues until the excessive partial vacuum in the storage system is relieved and is insufficient to maintain the cup 38 tilted, whereupon the cup 61 returns to its closed position.

Since the pressure of the liquid space exerts an equal force downwardly on cup 55 and upwardly on cup 56, and since the pressure in the vacuum line acts equally and oppositely on these cups, the control of valve 56 is completely independent of these pressures and is operated solely by the difference between the atmospheric and liquid space pressures acting on motor 37. Likewise valve 61 is operated by the difference between the atmospheric and liquid space pressures acting on motor 37, and is completely independent of the liquid space and gas-holder pressures.

While the invention has been described in connection with the details of specific embodiments thereof, it is not intended that such details shall be regarded as limitations upon the scope of the invention, except insofar as included in the accompanying claims.

What I claim as new and desire to secure by Letters Patent, is:

1. A motor for controlling valves in accordance with the differential between a standard pressure and a pressure to be controlled, comprising an inverted cup supported intermediate its ends off its center of pressure by trunnions, having its sides extending into sealing liquid and being exposed on one side to the standard pressure and on the other side to the pressure to be controlled, whereby said cup is caused to tilt in one direction or the other depending upon which pressure is greater.

2. In combination, a chamber, an inverted cup pivoted off its center of pressure and having its sides extending into sealing liquid in the chamber, means for effecting communication between the underside of the cup and the atmosphere, a vapor conduit adapted to be maintained under vacuum and a vapor conduit adapted to be maintained under pressure communicating with said chamber, valves uninfluenced by the pressure in the chamber and conduits, for controlling said conduits, means operably connecting the valves and the inverted cup, and a vapor conduit from a liquid storage system to said chamber.

3. In combination, a chamber, an inverted cup therein pivoted off its center of pressure, having its sides extending into sealing liquid and being exposed on one side to atmospheric pressure and on the other to the pressure in a liquid storage system, two conduits leading into said chamber, two pivoted valves adapted to close said two conduits, means connecting said inverted cup to said valves so that one or the other is opened when the cup tilts, and a conduit leading from the vapor space of said storage system into said chamber.

4. In combination, a chamber, an inverted cup therein pivoted off its center of pressure, having its sides extending into sealing liquid and being exposed on one side to atmospheric pressure and on the other to the pressure in a liquid storage system, two conduits leading into said chamber, valves closing said conduits, means connecting said inverted cup to said valves so that one or the other is opened when the cup tilts, and a conduit leading from the vapor space of said storage system into said chamber.

5. In combination, a chamber, an inverted cup therein pivoted off its center of pressure, having its sides extending into sealing liquid and being exposed on one side to atmospheric pressure and on the other to the pressure in a liquid storage system, two conduits leading into said chamber, valves closing said conduits, said valves being uninfluenced by the pressure on either side thereof, means connecting said inverted cup to said valves so that one or the other is opened when the cup tilts, and a conduit leading from the vapor space of said storage system into said chamber.

6. In a control device, a plurality of operating valves and means for controlling said valves in accordance with the differential between two standard pressures and a pressure to be controlled, said means comprising an inverted cup pivoted off its center of pressure, having its sides extending into sealing liquid and being exposed on one side to the standard pressure and on the other to the pressure to be controlled.

7. In combination, a chamber adapted to contain sealing liquid, a pair of conduits terminating in said chamber, a pair of rocking valve members adapted to close said conduits, said valve members having sides depending into said sealing liquid and being adapted to open in opposite directions, a rocking member in said chamber and located between said valve members, said rocking member being adapted to be influenced by the differential pressure between the chamber and another pressure, means carried by said rocking valves, and means carried by said rocking member, whereby the rocking member is adapted to cause one valve member to open when it rocks in one direction and to cause the other valve member to open when it rocks in the other direction.

8. In combination, a chamber adapted to contain sealing liquid, a pair of conduits terminating in horizontal open mouths above the liquid level in said chamber, a pair of rocking valve members adapted to close said conduits, said valve members having sides depending into said sealing liquid and being adapted to open in opposite directions, a rocking member in said chamber and located between said valve members, said rocking member being adapted to be influenced by the differential pressure between the chamber and another pressure, arms carried by said rocking member and projecting over said valve members, projections carried by said valve members and adapted to co-operate with said projecting arms of the rocking member so that one valve member is opened thereby when the said rocking member rocks in one direction and the other valve member is opened thereby when the said rocking member rocks in the other direction.

9. In combination, a chamber adapted to contain sealing liquid, a pair of conduits terminating in horizontal open mouths above the liquid level in said chamber, a pair of rocking valve members adapted to close said conduits, said valve members having sides depending into said sealing liquid and being adapted to open in opposite directions, weights on said valve members and abutments for said valve members whereby said members normally tend to remain in closed position, a rocking member in said chamber and located between said valve members, said rocking member being adapted to be influenced by the differential pressure between the chamber and another pressure, arms carried by said rocking member and projecting over said valve members, projections carried by said valve members and adapted to co-operate with said projecting arms of the rocking member so that one valve member is opened thereby when the said rocking member rocks in one direction and the other valve member is opened thereby when the said rocking member rocks in the other direction.

10. In a pressure control apparatus, a pair of pivoted valves, a rocking member therebetween adapted to be operated by the differential between two pressures and means on said valves and rocking member whereby on rocking of said member one valve is released and the other positively operated and on rocking of the member in the other direction the first said valve is positively operated and the second said valve is released.

11. In combination, a chamber, a pair of conduits therefrom, a pair of pivoted valves each controlling one of said conduits, means for causing said valves to close automatically, a rocking control member between said valves, means on said valves and rocking member adapted to co-operate to cause one of said valves to open when the control member rocks in one direction and to cause the other of said valves to open when the control member rocks in the other direction.

12. A storage system for volatile liquids which comprises a liquid storage tank having a vapor space therein, a vapor receiver, a conduit from said vapor space to said vapor receiver, means in said conduit for permitting and controlling the flow of gases therein in both directions, a pivoted member having its opposed sides exposed to different pressures, means for pivoting said member off its center of pressure, means for exposing one side of said member to atmospheric pressure, means for exposing the other side of said member to the pressure in said vapor space, and connections between said member and said control means whereby the flow of gas in the conduit is regulated and controlled in both directions in accordance with the difference between the pressure in the storage tank and the atmospheric pressure upon the outside of said tank.

13. A storage system for volatile liquids, which comprises a liquid storage tank having a vapor space therein, a vapor receiver, a conduit from said vapor space to said vapor receiver, means in said conduit for permitting and controlling the flow of gases therein in both directions, a receptacle for containing sealing liquid, an inverted cup adapted to have its sides extend into said sealing liquid, means for pivoting said cup off its center of pressure, connections between said cup and said gas flow control means, means for exposing one side of said cup to atmospheric pressure, and means for exposing the other side of said cup to the pressure in the storage system whereby said cup is caused to tilt when the pressure on one side exceeds that on the other so that the flow of gas in the conduit is dependent upon the difference between the pressure in the storage tank and the atmospheric pressure outside of said tank.

14. A system for storing volatile liquids which comprises a liquid storage tank having a vapor space therein, a vapor receiver, a receptacle containing a sealing liquid, an inverted cup having sides adapted to extend in said liquid, means for pivotally mounting said cup off its center of pressure, means for exposing one side of said cup to atmospheric pressure, means for closing the top of said container whereby a vapor space is formed therein, a conduit between said vapor space and the vapor space in said storage tank, a conduit between the vapor space of said container and the vapor receiver, and another conduit including a pump between the vapor space of the container and the vapor receiver, and means actuated by said pivoted cup in response to the difference between the pressure inside the storage tank and the atmospheric pressure outside of said tank for controlling the flow of gases through said conduits.

In witness whereof, I have hereunto set my hand this 7th day of April, A. D. 1927.

HAROLD V. ATWELL.